United States Patent

[11] 3,590,221

[72] Inventor Bernard J. Malkowski
Dearborn Heights, Mich.
[21] Appl. No. 638,255
[22] Filed May 15, 1967
[45] Patented June 29, 1971
[73] Assignee Burroughs Corporation
Detroit, Mich.

[54] TAPE-HANDLING APPARATUS
23 Claims, 14 Drawing Figs.

[52] U.S. Cl. ....235/61.11 R, 235/61.11 A, 242/55.19 A, 352/128
[51] Int. Cl. ....B65h 17/48, G06k 7/06, G03b 21/04
[50] Field of Search .... 242/55.19, 55.19 A, 55.18, 197, 198, 200; 352/126, 128, 78; 235/61.11, 61.112, 61.114

[56] References Cited

UNITED STATES PATENTS

| | | | |
|---|---|---|---|
| RE22,363 | 8/1943 | Miller | 352/78 X |
| 1,144,693 | 6/1915 | Delaney | 242/55.18 |
| 1,631,137 | 7/1927 | Kincade | 242/55.18 |
| 2,129,467 | 9/1938 | Frederick | 352/128 |
| 3,087,686 | 4/1963 | Wren | 242/198 |
| 3,088,687 | 5/1963 | Martin | 242/55.19 A |
| 3,126,162 | 3/1964 | MacKenzie | 242/55.19 A |
| 3,227,508 | 1/1966 | Bavaro | 242/55.19 A X |
| 3,287,508 | 11/1966 | Morrison | 242/55.19 A X |
| 3,402,982 | 9/1968 | Lemelson | 352/126 X |
| 3,435,191 | 3/1969 | Peddle | 235/61.11 |

*Primary Examiner*—Daryl W. Cook
*Assistant Examiner*—Robert M. Kilgore
*Attorneys*—Kenneth L. Miller, Wallace P. Lamb, Edwin W. Uren and Paul W. Fish

ABSTRACT: Apparatus insertable in and cooperable with a perforated tape reader for providing an improved supply and takeup path for guiding a length of tape past a sensing station in either a self-threading or endless loop mode. In accordance with the first embodiment of this invention channel members in a cartridge frame define input and output paths for guiding tape in a self-threading fashion into feeding relationship with a feed sprocket which transports the tape past a sensing station. In accordance with the second embodiment of this invention, an endless loop tape cartridge including a closed, angularly disposed bin and transport path provided protected storage for the tape when it is not in use and protected transport for it when it is being fed past a sensing station. Tape from the endless loop stored in the bin in helical form is fed along a predetermined transport path past a tape sprocket which controls the feeding of tape from the inter loop past the sensing station and on to the outer loop of the tape mass.

Figure 1:
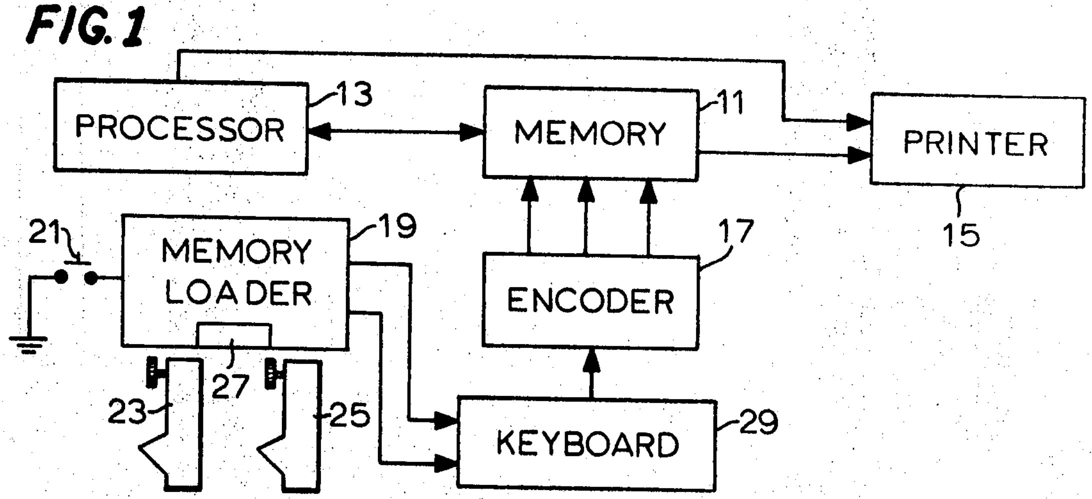

INVENTOR.
BERNARD J. MALKOWSKI.

BY Paul W. Fish

ATTORNEY.

TAPE-HANDLING APPARATUS

SUMMARY OF THE INVENTION

This invention relates to tape handling and transport apparatus and more particularly to improved, manually insertable tape cartridge apparatus cooperable with tape-sensing apparatus for providing improved supply and takeup guide paths to and from a sensing apparatus for providing improved supply and takeup guide paths to and from a sensing station and for facilitation endless loop and self-threading operation of a tape reader.

BACKGROUND

As is known in the data manipulation and processing arts, it is often desirable to store information for subsequent use. For example, in billing, accounting and other repetitively executed operations of a computer or data processor, certain information such as the program, customer information or other invariable data may be stored and conveniently recalled and used when it is desirable to perform the specific data processing operation. Information to be temporarily or permanently stored may be recorded, for example, on magnetic tape as magnetizing areas of the tape in accordance with a predetermined code. Another commonly employed method for storing information is to selectively aperture a tape-member in accordance with a multilevel code. In either tape information storage method, the information is encoded in a specific code and stored at particular areas of a tape. To be useful such information must be retrievable in the sense that the information is capable of being read from the tape as it was recorded with a high degree of accuracy.

The storage of such recorded information in the form of a tape has been a problem in the art. Where, for example, a relatively short punched tape is to be utilized to store information, it is difficult to insert and thread the tape past the reader. Further it is difficult to store the tape so it will not be damaged. The storage problems are compounded as the length of the tape increases. Thus, for example, with a 10- or 12-foot tape, which would be necessary to store a predetermined amount of information, the storage conditions must be designed to insure the tape will not be damaged. For example, with a perforated paper tape, great care must be taken to insure that the tape will not kink, snarl or be folded or torn during storage. The storage facilities must insure that handling and/or storage do not damage the tape if it is to be useful for, in general, the stored information is useful only if it may be retrieved and read into a machine in the exact form in which it was recorded. In the case of a paper tape, any kink, snarl or fold in the tape may result in such a change that reading the information stored in that damaged area of the tape could result in a reading error.

The prior art discloses several endless loop cartridge structures for protecting tape during transportation or storage. In general the prior art tape cartridge structures are characterized by complex mechanical features necessary to control the guiding and feeding of tape from the inner turn onto the outer turn past the operating zone at the proper speed and direction. The complex mechanical structure of the prior art cartridge devices makes them difficult to fabricate and expensive to manufacture.

It is, therefore, an object of the present invention to improve and structurally simplify apparatus for feeding and guiding a tape past the sensing station.

It is another object of the present invention to provide improved tape guide apparatus for facilitating self-feeding and threading operations for transporting a perforated tape past a reading station.

It is a further object of the present invention to improve tape storage and transport apparatus for protecting a tape during storage and for guiding the stored tape past a tape-sensing station.

It is a still further object of the present invention to simplify the storage and subsequent utilization of information stored in the form of an endless loop, punched tape.

It is yet another object of the present invention to provide mechanically reliable and structurally simple, low-cost tape-handling apparatus. It is still another object of the present invention to simplify the manufacture of tape-handling apparatus including self-feeding and endless loop cartridge devices cooperable with a tape reader.

In accomplishing the above objects and other desirable aspects, applicant has invented novel tape transport and guide cartridge apparatus insertable in and cooperable with a stationary perforated tape reader for guiding a tape past a reading station in either a self-threading or endless loop mode. The manually insertable tape-handling cartridge of the present invention carries drive means cooperable with a tape reader for transporting the tape past the reading station.

In accordance with the first embodiment of the present invention, input and output channels are defined by shaped guide members carried by a frame or housing. Resilient means in the input channel guides the leading edge and urges an inserted tape into self-feeding relationship with a feed sprocket wheel which in operation is mechanically coupled to and driven by the tape reader to drive the tape past the reading station. In accordance with the second embodiment of the present invention an essentially key-shaped frame or housing defines a closed storage bin and tape transport path for an endless loop tape. The tape is stored in the bin in the form of a spiral tape mass with the innermost and outermost turns forming an extended narrow loop which is trained about a feed sprocket in the transport path. Support and guide means fixedly mounted in the bin and angularly disposed to the transport path controls the wrap, unwrap and feed angles to ensure that the tape is fed and taken up in a straight line essentially tangential to the feed sprocket.

Figure 2:
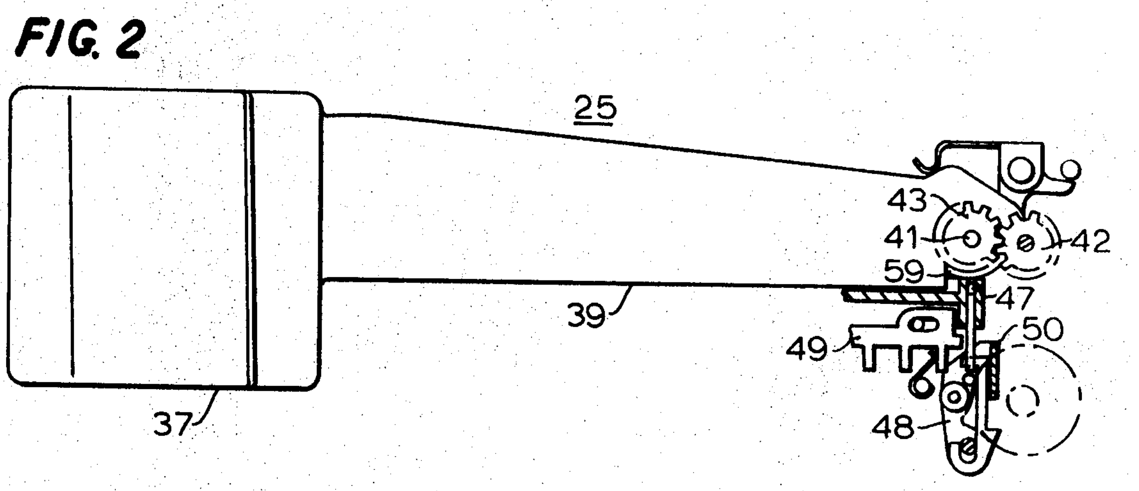
Figure 9:
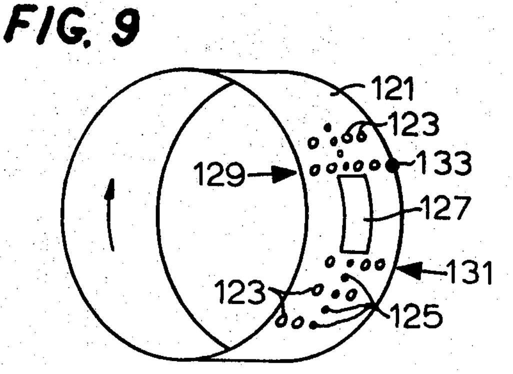
Figures 3, 3A:
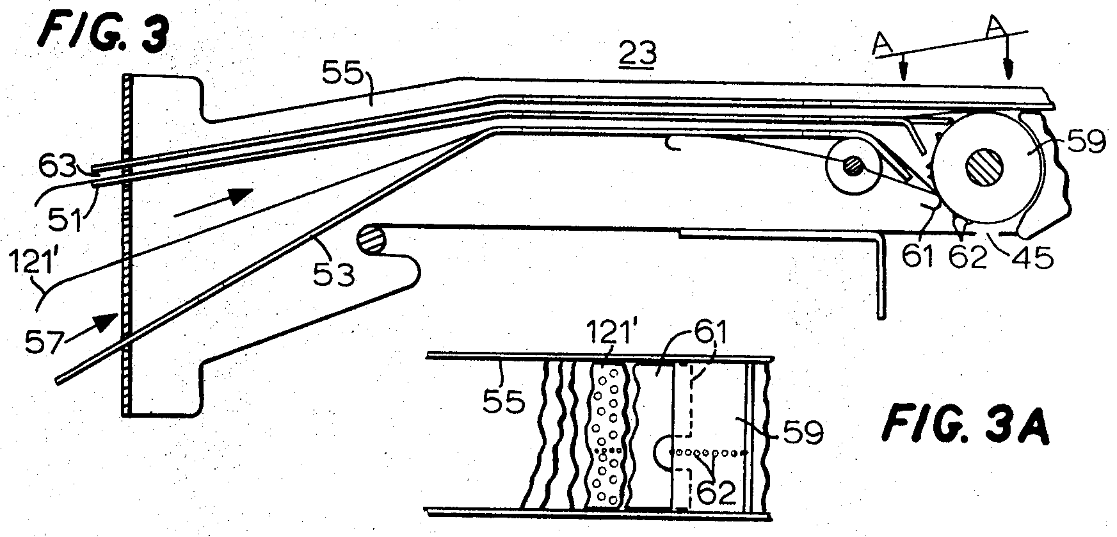
Figure 4B:
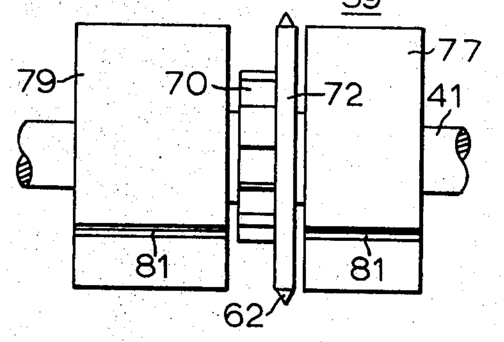
Figure 4A:
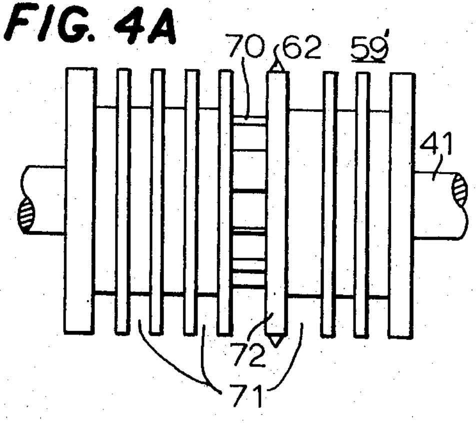
Figure 5A:
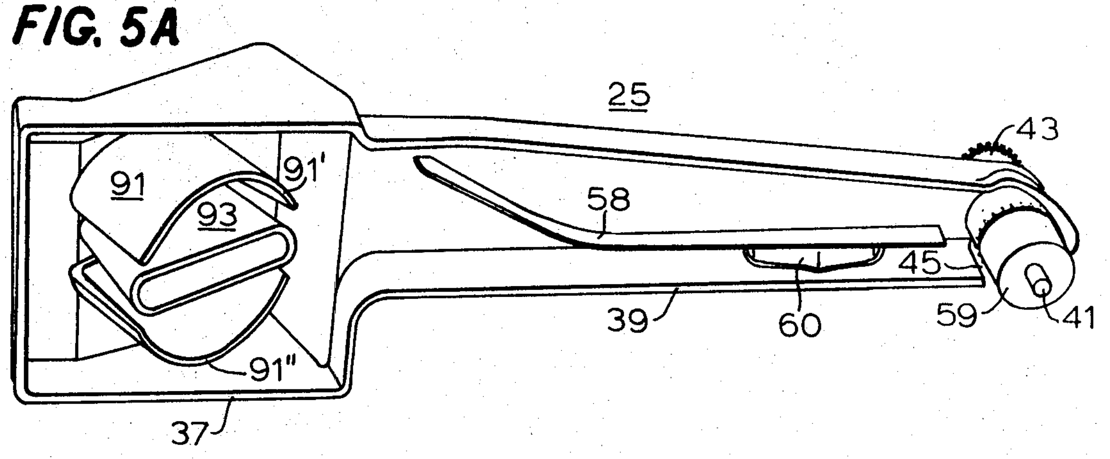
Figure 5B:
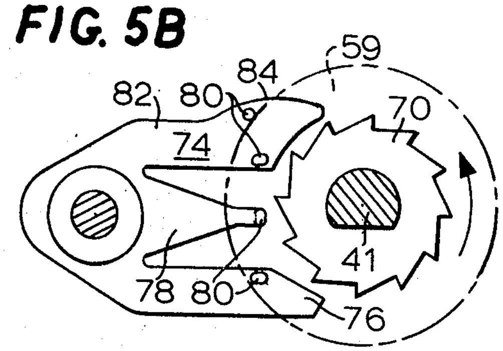
Figure 5C:
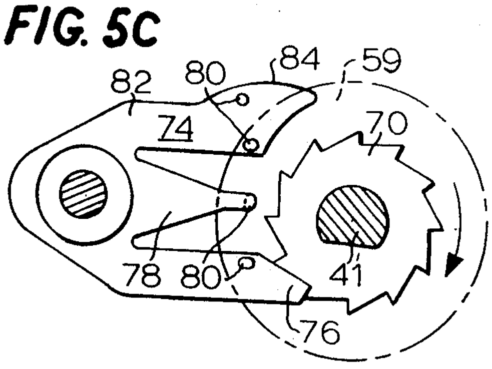
Figure 7:
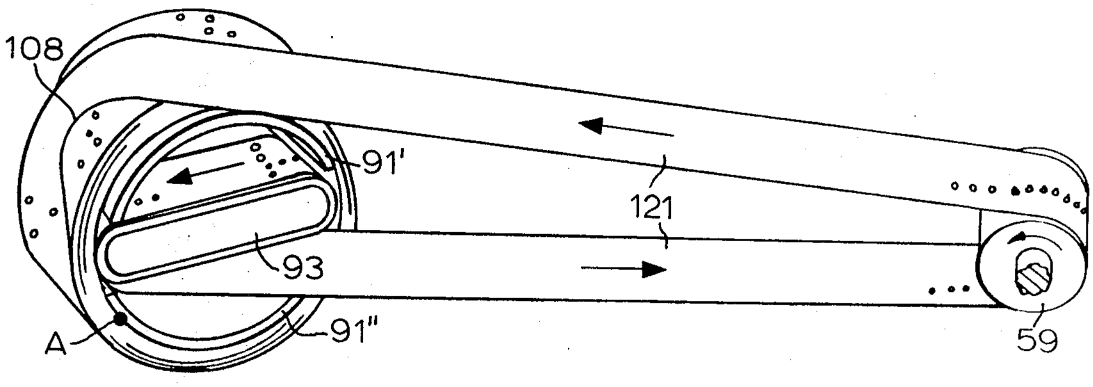
Figure 8:
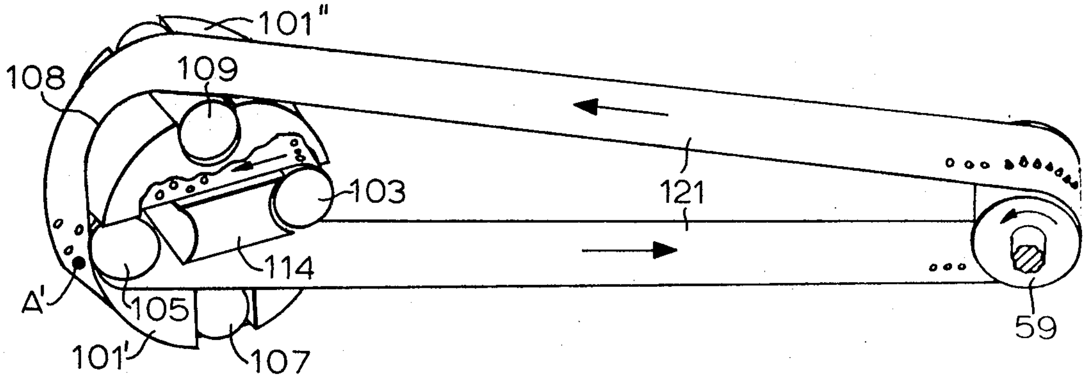
Figure 6:
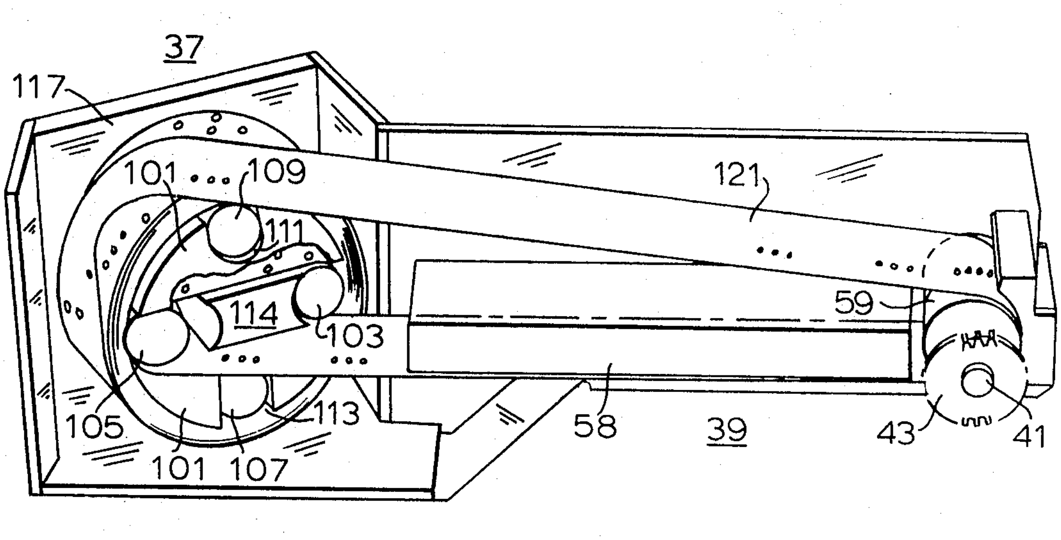
Figure 10:
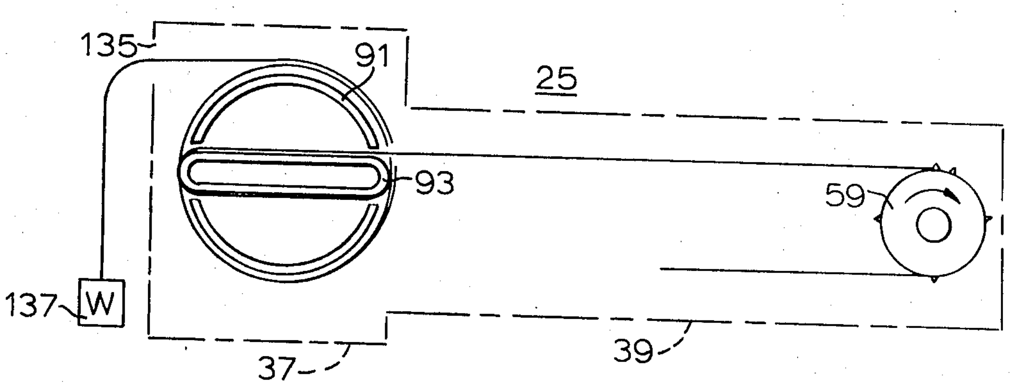

For a more complete understanding of applicant's invention reference may be had to the following detailed description in conjunction with the drawings wherein:

FIG. 1 is a block diagram of a data processing system compatible with the tape apparatus in accordance with the principles of the present invention, FIG. 2 is a side view of one embodiment of a tape cartridge embodying the principles of the present invention, FIG. 3 is a sectional view of another embodiment of a tape cartridge in accordance with the principles of the present invention, FIG. 3A is a sectional view taken along the line 3A–3A of FIG. 3, FIGS. 4A and 4B show two embodiments of a drive sprocket and tape guide in accordance with the principle of the present invention, FIG. 5A is a side view of one embodiment of an endless loop tape cartridge in accordance with the principles of the present invention FIGS. 5B and 5C illustrate two views of a unidirectional sprocket rotation control mechanism in accordance with another aspect of the present invention, FIG. 6 is a perspective view of a second embodiment of an endless loop tape cartridge in accordance with another aspect of the present invention, FIG. 7 is a simplified illustration of the tape path through support and guide apparatus in accordance with one embodiment of the endless loop cartridge in accordance with the principles of the present invention, FIG. 8 is a simplified illustration of the tape path through support and guide apparatus of an endless loop cartridge in accordance with another aspect of the principles of the present invention, FIG. 9 is a pictorial representation of a tape loop utilizable in the endless loop taped cartridge in accordance with another aspect of the principles of the present invention, and FIG. 10 is a schematic representation of a method and apparatus for determining and developing the proper tension in a tape loop for an endless loop cartridge in accordance with the principles of the present invention.

Referring now to FIG. 1 there is shown a schematic block diagram of a data processing system utilizable in accordance with the principles of the present invention. In the data processing or computer system, information in the form of machine recognizable language is stored in a memory 11, of any known type, which is in communication with the processor 13 and printer output device 15. The processor 13 contains the logical circuitry required for performing the manipulative steps for accomplishing the desired computational function. For example, the processor 13, under the control of the program instructions stored in the memory 11, may fetch information from the memory 11, process it in a predetermined manner as dictated by the program steps and store it in the memory or generate an output print. The output from this system is generated by the printer 15 which may be activated by the processor 13 or memory 11. The information to be entered into the system may be entered on keyboard 29 which in response to the depression of a key actuates, in any known manner, an encoder 17 which generates appropriate electrical signals representative of the thus selected information characters which then may be stored as information at a preselected memory position in memory 11.

In accordance with one aspect of the present invention, information stored on tape may be loaded into memory 11 from a memory loader 19. As shown switch 21 may be actuated by an operator to control the energization and utilization of memory loader 19. As hereinbefore set forth, it is often desirable to load previously stored information, for example, on a punched paper tape into the memory 11 of the processor system. Tape-handling cartridges 23 and 25 are arranged for insertion into slot 27 of memory loader 19 to thereby selectively position a tape in cooperable juxtaposition with an appropriate reading device, not shown in FIG. 1, in memory loader 19. In the preferred embodiment, the tape-handling cartridges 23 and 25, which may be manually inserted as required for operation of the system into the memory loader 19, facilitate, in a manner hereinafter to be more fully described, transporting either an endless loop tape or straight length of tape for reading by the memory load reader. Information thus read from the information stored on the tape is coupled via the encoder 17 to the memory 11 and stored in the memory in response to the actuation of switch 21 whenever one or the other of the tape-handling cartridges 23 or 25 is inserted in slot 27 of the memory loader 19.

After reading the information from a tape, the system operates in a normal computational mode performing successive computational operations under control of the program. As hereinbefore set forth, the operator may load information into the memory via the memory loader whenever a tape-handling cartridge is inserted into the slot 27 of the memory loader 19. The encoder 17 in response, for example, to stops positioned by the tape reader in the memory loader, generates information signals corresponding to the previously recorded information on the tape.

Referring now to FIG. 2 there is shown a side view of the preferred embodiment of one aspect of an endless loop tape-handling apparatus in accordance with the principles of the present invention. As shown the tape to be read into a computer system similar to that shown in FIG. 1, is stored and/or arranged to be fed through an essentially key-shaped hollow frame or housing 25. In the case of the endless loop apparatus, this frame comprises a bin area or compartment 37 for storing the tape in the form of a spiral reel and an elongated tape transport compartment providing a path for a narrow extended loop of tape from its reel in the bin 39. At the end of the transport path opposite the bin, a feed sprocket wheel 59 is fixed to the shaft 41 for joint rotation therewith. The sprocket 59 is arranged to provide rotational drive for the loop of tape encircling the sprocket. Carried on the outer end of shaft 41 exteriorly of the tape transport compartment 39 is a pinion 43. The pinion 43 is adapted to be slidably engaged with drive gear 42 which is mechanically coupled to and driven by a power source, not shown, associated with the reading station of the memory loader 19. The tape loop thus stored in the cartridge may be advanced past a reading station in the transport path. For example, aperture 45 (FIG. 3) is adapted to receive, in the case of the punched paper tape, a plurality of aligned fingers or sensing elements 47 for sensing the perforations at the various informational levels of the tape. As shown the difference in the travel of feeling or sensing elements 47 as limited by the tape or permitted by apertures therein may be employed to selectively set stops. For example, oscillatorally driven bellcrank 48 and hammer 50 which in cooperation with the code bails 49 of keyboard 29 generate a unique character indicating position combination of the code bails which may be read by the encoder 17 to generate coded signals corresponding to the character read from the paper tape.

As hereinafter to be more fully explained, a tape is stored on a support and guide fixedly mounted in the bin 37, which is designed to control the path and angle at which tape is fed from the innermost winding of the spiral reel and back onto the outermost winding of the support via the tape transport path 39. The feed sprocket 59 is arranged to pull and deliver tape from the bin storage 37 to the tape transport path 39. As the tape leaves the feed sprocket 59 it is returned along a parallel path and wound onto the outermost turn of the tape in the storage bin 37.

Referring now to FIG. 3 there is shown an exposed, side view of applicant's self-threading tape feed cartridge with the front cover removed. As shown, members 51 and 53 mounted on side 55 of frame 23 define an input channel for guiding tape from an inlet 57 to the vicinity of a feed sprocket 59. As hereinabove discussed in conjunction with FIG. 2, the tape feed sprocket 59 is arranged to be driven by drive gear means associated with the tape reading station whenever the tape is to be read into the memory loader. Spring 61 is arranged to urge the forward end of a tape fed into the input channel 57, so as to bring it into feeding engagement with the teeth 62 of drive sprocket 59. The spring 61 is held in resilient contact with sprocket 59 and has a cutout or U-shaped bend (FIG. 3A) in the area of the feed teeth 62 of the sprocket 59. In operation with the forward end of an inserted tape held in contact with the sprocket 59, whenever the drive sprocket is rotated the feed apertures of the tape are engaged by the sprocket teeth and the tape is transported past the sensing station and carried to the output aperture 63 via guide member 65 and the other side of guide member 51 carried by the frame which together define an exit channel. As shown in FIG. 3A the spring 61 is arranged to resiliently urge an inserted tape in the input channel into contact with the drive sprocket thus facilitating the engagement of the feed holes of the tape by the teeth 62 of drive sprocket 59.

As discussed with reference to FIG. 2, the tape-sensing aperture 45 is designed to accommodate the sensing fingers of the perforated tape reader to permit the fingers to sense the information apertures of the tape and in response thereto to position appropriate mechanical sensing mechanisms to generate unique signals in response to the various code permutations of the multilevel code. As shown in FIG. 2 the preferable location for the sensing aperture 45 is in the tape transport path 39 proximate the feed sprocket. While the sensing aperture may be located in any convenient point along the transport path, in the preferred embodiment of the present invention, the sensing is performed as a portion of the tape loops the sprocket 59.

Referring now to FIGS. 4A and 4B there are shown two embodiments of the sprocket wheel assembly 59 which facilitate sensing the tape as it loops the sprocket. As shown in FIG. 4A, the drive sprocket and guide 59′ comprises a cylindrical member or drum having a plurality of circumferential grooves 71 extending in a spaced-apart, parallel fashion about the major axis of the cylindrical guide member. The grooves 71 are shown for a seven-level code in which three levels of information are located on one side of the feed sprocket teeth 62 and four information levels are positioned in line therewith on the other side thereof. The grooves 71 are so dimensioned as to allow the sensing fingers 47 (FIG. 2) of the perforated tape reader to pass through the information configured apertures in the tape and travel a sufficient distance to actuate associated decoding mechanisms.

With reference to FIG. 4B another embodiment 59'' of the sprocket 59 is shown in which the rotatable drive sprocket 72 is positioned between fixedly mounted cylindrical guide members or drums 77 and 79. The slot 81 extends on either side of drive sprocket 72 in the respective fixed cylindrical guide members 77 and 79. The slot 81 is dimensioned to permit the various sensing fingers associated with the respective levels of the code to pass through the tape into the slot 81 a sufficient distance to provide sufficient movement of the fingers to actuate decoding stop mechanisms as hereinabove described while the tape is transported over the sprocket by the rotation of the drive sprocket 72. In either embodiment the number of circumferential grooves 71 or the length of the slot 81 is preferably dimensioned to permit the sensing fingers to operate therein to read the various information levels or tracks of the tape as it is transported by the rotation of the drive sprocket.

In the embodiments of the drive sprocket 59' and 59'' as shown in FIGS. 4A and 4B respectively, a ratchet member 70 is fixed to the shaft 41 proximate the sprocket 59. The ratchet 70 in cooperation with a pawl, not shown, is arranged, in a manner hereinafter to be more fully described, to prevent undesirable reverse feed rotation of the sprocket 59.

Referring now to FIG. 5A there is shown a side view of one embodiment of an endless loop tape cartridge in accordance with one aspect of the present invention. For clarity one-half of the frame or cover 25 has been removed exposing the interior structure of the bin 37 which exhibits a cup-shaped formation and the transport compartment 39 which opens at one end into the upper portion of the bin 39. As hereinbefore described, the cartridge is designed to support and protect an endless loop of tape in the bin area and transport path. Support 91 and feed guide means 93 facilitate the guiding of the endless tape (not shown in FIG. 5A) along the transport path 39 which includes the drive sprocket 59. As previously mentioned, the drive sprocket 59 is fixed to the shaft 41 which carries pinion 43 and which is arranged to be driven by, for example, a gear mechanically associated with a tape-reading apparatus. As hereinafter to be more fully explained, the segmental tape support 91 and feed guide 93 are angularly disposed relative to the path of the tape transport 39 thus facilitating the tangential feeding of the tape from the innermost turn on the support member 91 via guide 93 onto the drive sprocket assembly 59. As shown the segmented support and guide members in accordance with one embodiment of the present invention comprise a pair of spaced-apart, cylindrical tape reel supports 91' and 91'' and a generally elliptical or oval-shaped inner feed guide 93. Support member 91 may be of unitary construction or molded in separate halves. As will be more clearly explained in conjunction with FIG. 7, the respective halves of the segmented circular reel support 91 are designed to support a spiral coil, endless loop of tape, i.e. tape mass, in coiled form with the intermost turn making an essentially U-shape bend over one-half of the segmented support 91'' and the elliptical feed guide 93 prior to being fed onto the feed sprocket 59. As the loop in the transparent compartment 25 changes direction and leaves the opposite side of the feed roll assembly 59, the tape is fed along a parallel transport path away from the sprocket along a return path divided from the feed path by guide member 58 and onto the outermost turn of the coiled portion of the tape supported on the segmented support 91'. As hereinafter to be explained, a plane passed normally through the tape mass supported within the storage bin 37 is angularly disposed in the order of 30° relative to the transport path in compartment 25. The feed means operably associated with the inner tape, i.e., the elliptical feed guide 93, guides the tape in a U-shaped turn which facilitates the feeding of the tape out of its helically coiled form and tangentially to the feed sprocket 59. The essentially key-shaped cartridge including the respective support members 91 and 93, the bin 37, transport path 39 and the guide member 58 may be fabricated or molded from any material for example, plastic. With the other half or cover of the frame affixed in closing, complementary relationship with the frame 25, for example, via mechanical fasteners, not shown, the endless loop of tape is protected in storage and may be conveniently threaded into a tape reading machine (FIG. 2) by inserting the apparatus into the reader as hereinabove described in conjunction with FIG. 1.

Resilient leaf spring 60 which depends from channel defining guide member 58 into the feed path of transport path 39 is arranged to bias the tape in conjunction with the feed teeth sprocket 59 as the tape is fed by sprocket 59. The spring 60 forces the tape into frictional contact with the frame 25 thus preventing an accumulation of dust particles in the feed area which could foul the operation of the tape reading mechanism.

Referring now to FIGS. 5B and 5C there is shown a pawl and ratchet mechanism for restraining or arresting undesirable, counterfeed rotational movement of feed sprocket 59, for example, during the insertion of the cartridge into a tape reader. As shown in these two FIGS., a three-armed pawl 74 which may be supported on a shaft, for example, carried by the frame 25 in the vicinity of the feed sprocket 59, is cooperably juxtapositioned with ratchet 70 which as shown in FIG. 4 is fixed to the common shaft 41 with sprocket 59. As shown in FIG. 5B the counterrotation restraining pawl 76 is inoperative i.e. not engaged during the normal rotation of feed sprocket 59. In response to an attempted counterfeed rotational movement of sprocket 59, pawl 76, as shown in FIG. 5C, engages the nearest tooth of ratchet 70 and is rotated thereby into locking relationship, as shown, thereby restraining or arresting further counterrotation of ratchet 70 and thus the counterrotation of sprocket 59.

The three arms of pawl 74 are further designed to generate a stabilizing, friction drag on the sprocket 59 during rotation thereof. For example, with reference to FIG. 4A the center arm 78 and projections 80 carried by arms 76 and 82 of pawl 74 are preferably designed to ride in one or more of the circumferentially extending slots 71. The respective arms 76, 78, and 82 are thus in frictional contact with the sprocket 59 and during rotation thereof generate a retarding, frictional drag.

The curved surface portion 84 of arm 82 is designed to deflectively engage tape fed around the sprocket 59 and thus strip the tape from the feed sprocket holes thereby facilitating the guiding of the tape from the sprocket 59 along the return portion of transport path 39. While satisfactory operation of applicant's cartridge device may be obtained without the pawl and ratchet mechanism illustrated in FIGS. 5B and 5C, improved operation is obtained by including this combined control and tape-stripping mechanism.

Referring now to FIG. 6 there is shown another embodiment of an endless loop tape cartridge in accordance with another aspect of the present invention. As in FIG. 5A, the embodiment of the endless loop cartridge shown in FIG. 6 is arranged to support and store tape in a bin area 37 and to transport the tape via a sprocket 59 along a transport path 39. The storage and transport of tape in the cartridge illustrated in FIG. 6 are essentially the same as that illustrated and described in conjunction with FIG. 5A, however, the structural and functional differences in the support and the feed guide means will be explained in detail. In the embodiment shown in FIG. 6 the tape is supported in the bin area 37 on a pair of deformed, semicylindrical supports 202 with the innermost turn of the tape loop or spiral wrap in frictional engagement with the exterior wall support surfaces of the pair of semicircular supports 101. Disposed intermediate the spaced-apart, semicylindrical tape supports are a plurality of stationary guideposts 103 and 105 and guide 111. The guideposts are between or intermediate the semicylindrical supports 101 for engaging in guiding relationship the innermost loop of tape as it is withdrawn from the center of the tape spiral guide. Post 105 is dimensioned and angularly disposed relative to the supports and transport path for skewing the tape and controlling the angle at which the tape withdrawn from the innermost turn is fed to the transport path. The guideposts 103 and 105 which may be rotatable but preferably are fixed, as the guide 93 describing in conjunction with FIG. 5A, insures that the tape fed from the inner turn is guided past the helical turns of the tape mass and is tangentially fed to the drive sprocket 59. As shown and hereinafter described in conjunction with FIG. 8, the stationary guideposts 103 or 105 mounted in the bin 37 serve to guide the tape in an essentially U-shaped turn in the area interior to or intermediate the supports 101—101 as the innermost turn leaves lower cylindrical support 101 before the tape is fed to the feed sprocket 59.

Rollers or posts 107 and 109 are positioned in recesses 111 and 113 on the fixed, semicylindrical support members 101. The posts 107 and 109 are so dimensioned such that they form an essentially common support plane with the outer surface of support members 101. Similarly posts 103 and 105 are positioned in the space intermediate the respective support members 101 such that the exterior surfaces of the post 103 and 105 extend flush with the exterior surfaces of the support member and form an essentially continuous tape wrap circular support plane with the support members 101. Post 105 while forming an essentially continuous support plane with the adjacent surfaces of support members 101 is angularly disposed or canted from the normal to the back plane 117 of the bin which supports the supports 101 and the respective guides 103, 107 and 109. By inclining the post 105 at an angle relative to the bin back plate 117, which make the axis of the post 105 substantially parallel with the shaft 41 which supports the sprocket assembly 59, the tape feed from the intermost turn of the sprocket reel is guided in untwisted condition past the helical turns of tape wrapped upon the support 101. Positioning the post 105 in a plane substantially parallel to the plane of the shaft 41 facilitate skewing the angle at which tape is withdrawn from the innermost turn of tape supported in the bin to guide it past the spiral wrap and direct it in a straight line tangential path to the feed sprocket 59.

Referring now to FIGS. 7 and 8 there are shown simplified drawings illustrating the tape path for the respective embodiments of the support elements, guides and drive elements of the endless loop cartridge in accordance with the principles of the present invention. A single or a few loops of tape is illustrated to simplify the understudy of the endless loop tape path, however, an additional length of tape would normally be stored as spiral or helical wraps on the support members as hereinbefore explained.

With reference to FIG. 7, the support and guide members utilized in the embodiment of the endless tape cartridge illustrated in FIG. 5A are shown. Tracing the tape path from an imaginary point A on the tape, it may be seen that tape in the direction of feed is fed in frictional engagement with lower support member 91'' onto the top portion of elliptical or oval guide 93 and around the turn of the elliptical guide remote from the sprocket 59. From the end of elliptical guide 93 remote from the sprocket, the tape is fed in a straight line tangential to the feed sprocket 59. It may be seen that the tape path thus forms an essentially U-shaped turn about the elliptical support before being fed to the drive sprocket 59. As the tape returns from sprocket 59, which is rotatable in the direction indicated by the arrow, it is fed back onto the outermost turn of the tape spirally wrapped on the upper support 91' and thus, in the case of a single turn, completing the endless loop path. The surface of the endless loop tape is in frictional engagement with the respective surfaces of the support and guide members 91' and 93', and in the case of multiple spiral turns, the respective turns would be in sliding frictional engagement during tape feed operations. The bulge or protuberance 108 is formed in the tape as it is fed in a straight line from the sprocket 59 onto the angularly disposed support 91'. As shown in FIG. 7 and hereinabove explained in conjunction with FIG. 5A, the tape as it leaves the intermost turn via the elliptical guide 93 is skewed to freely pass the tape supported in a spiral wrap on supports 91 and to extend in untwisted straight-line condition to the sprocket wheel.

With reference to FIG. 8, a simplified illustration of the support, guide means and sprocket for the endless loop cartridge illustrated in FIG. 6 is shown. Once again for clarity, a single-turn endless loop is shown. Considering the imaginary point A', the tape path in the direction of feed proceeds from the lower support member 101' onto the post 103, guide 114, and around post 105 thereby forming an essentially U-shaped turn in the tape. From post 105 the tape is fed in a straight line substantially tangent to the lower side of feed sprocket 59. The angular displacement of post 105 relative to the supports 101 as hereinbefore described is sufficient to provide clearance for the tape as it passes in front of the supports 101 and any turns of tape wound on the supports 101 as it passes to the feed sprocket 59. From the feed sprocket 59, rotatable in the direction of the arrow, the tape passes along a substantially parallel return transport path and is wound onto the outermost turn supported by upper support 101 forming the bulge 108. The tape is stored and transported in frictional engagement with the surfaces of the supports and guides and is arranged to be drawn past the sensing station in response to the rotation of drive sprocket 59 by feeding tape from the innermost turn and wrapping it onto the outermost turn on the support members 101.

Referring to FIG. 9, there showed an illustrative portion of perforated tape loop utilizable in applicant's tape cartridge in accordance with another aspect of the present invention. The tape 121 has a plurality of information apertures 123 and feed apertures 125 therein. In the endless loop tape cartridge embodiment of the present invention, it is desirable that the information stored on the tape be read accurately and thus it is necessary that the tape be made to traverse one and only one complete revolution with the information characters from the first to the last thus being presented only once to the sensing station of the associated perforated tape reader. While it is possible to employ an elaborate clutch mechanism to insure that the tape drive makes a desired number of complete revolutions to permit reading the entire tape, FIG. 9 shows a simple, reliable method for insuring only one revolution of the tape 121. As shown and is known, the respective information and feed apertures 123 and 125 are in-line across the width of the tape and the respective successive information columns or lines, one for each character, would appear at the sensing station as a result of the teeth of the drive sprocket engaging successive feed apertures 125 and moving the tape through the sensing station.

As shown in FIG. 9, a portion of the tape in the area of the feed apertures is removed forming a longitudinal slot 127. The dimensions of slot 127 are determined by the dimensions of sprocket 59. In the feed operation of this selectively mutilated tape, if prior to the insertion of the endless loop cartridge into the memory loader of FIG. 1, the tape is positioned with the feed sprocket in driving relationship with the portion of the feed apertures 125 of the tape forward of slot 127 in the direction of feed, as indicated by the arrow, then the tape is set to be driven past the sensing station in the direction of the arrow on the tape from the first line of information 129 to the last information line 131. Initial information line 129 may be suitably marked or identified by a mark 133 on the tape or tape edge to facilitate initially positioning the tape to begin a feed cycle. After the tape has made one revolution, i.e., all information has been read, the sprocket will then idle in the slot 127 which is void of the feed apertures 125. In this manner one revolution of the tape brings all information lines once in succession, from the first to the last, past the sensing station and then the tape will automatically stop feeding as the drive fingers 62 of the sprocket idle in slot 127 and are thus unable to engage feed apertures 125 of the tape.

Referring now to FIG. 10 there is shown an illustrative apparatus and method for developing the proper tension in the length of tape prior to joining the respective ends thereof to form the endless loop. As is known, where an endless loop tape is to be driven past a sensing station in either a continuous manner or in an intermittent motion, stepwise manner, the tension in the loop must be sufficient to maintain the lengths of the tape that extend from the spiral wound tape mass supply to the operating zone from the inner and outer turns respectively and the spiral tape mass coil itself in the desired configuration. The tape must be held sufficiently taut to prevent the tape from becoming so slack as to permit the tape in the bin or transport path to kink or foul. On the other hand, the tension must not be so great as to cause the tape to bind, rupture or break. With the tape fed from the inner turn of the spiral supply coil past the operating or sensing zone proximate the feed sprocket and being returned to the outer turn of the spiral coil, it is apparent that the various turns of the tape on the spiral tape mass in the bin turn at different angular velocities due to the difference in the diameters of the respective turns. The various helical tape loops turn or rotate about the fixed axis of the supply coil and thus each successive turn from the outermost turn to the smallest innermost turn must rotate or slip at slightly increased velocity to maintain a given rate of tape feed through the sensing station. The successive turns must continually slip relative to each other in the proper relationship to the actuating drive of the sprocket to maintain the coiled mass and the tape loop in the desired loop and supply reel configuration. The use of the apparatus and method described and illustrated in FIG. 10 provides one manner for achieving the proper tape tension in the coil after it has been mounted on a support and feed means in the bin before the loop is closed. The exact tension will of course depend upon the physical characteristics of the tape and the weight described in conjunction with this method and apparatus has been found satisfactory for lengths of paper-clad mylar tape between 2 and 45 feet. Similarly the tension will be a function of the material used to fabricate the support and guides. The frame, supports and guides may be fabricated from any material, however for ease of construction and self-lubrication purposes it is desirable to form the supports, frame and guides from plexiglass or smooth plastic.

As shown in FIG. 10, the proper tension may be achieved before the tape loop is closed by applying a tensioning force to the tape mass supported in the bin 37 by manually or selectively rotating the drive sprocket 59 while it is in driving engagement with one free end of the tape and a tensioning weight 137 is attached to the other free end of the tape. As shown the tape is supported and guided on the supports 91 and 93 in the tape bin 37 in a helical coil or spiral form and the innermost turn is threaded or guided from the centrally disposed guide 93 onto the sprocket 59. With the feed sprocket engaging the feed apertures 125 of the tape, tension may be developed in the tape mass by manually rotating the sprocket to begin feeding the portion of the tape in the transport path. The slack in the various tape mass turns of the spiral coil is taken up by rotating the sprocket in the direction indicated by the arrow. The outermost loop of the tape passes from support 91 through an aperture 135. This free end of the tape is attached by any known means to a tension-developing weight 137. In practice a satisfactory tape mass tension has been achieved for paper and paper-clad mylar tape by rotating the feed sprocket until the tension in the tape is such that continued rotation of the drive sprocket would begin to move or lift the weight 137. In a typical embodiment of this tensioning apparatus for perforated paper tape or paper-clad mylar type, a weight in the neighborhood of 1 ounce has been found to develop the proper tension for lengths of tape up to 45 feet. By pretensioning the stored tape mass in this manner before the tape loop is closed, by splicing the ends of the inner and outer turns together, satisfactory results have been obtained in applicant's endless loop tape cartridge.

While the foregoing disclosure is directed to the problems of handling a thin, flexible perforated paper tape for computing or data processing apparatus, the principles of applicant's invention may be applied to handling other kinds of tape for controlling other types of apparatus. It will be apparent to those skilled in the art that various changes, substitutions and other departures from the disclosed illustrative embodiments of applicant's apparatus may be made without departing from the scope of the present invention which is described with particularity in the appended claims.

What I claim is:

1. An endless loop tape cartridge insertable in and cooperable with a tape reader for guiding a tape past a sensing station, said cartridge comprising, a housing having a first compartment elongated in one direction to form an essentially closed tape transport path and further having a second compartment to form a tape storage bin opening into one end of the tape transport compartment, rotatably mounted drive means proximate the end of the tape transport compartment remote from the bin for driving a tape loop from the bin past the sensing station of a tape reader and for returning the tape to the bin, segmental support means fixedly mounted in the bin in a plane inclined relative to said tape transport path for receiving and supporting the helically coiled portion of an endless loop tape at the same inclination in the bin so that the axis of the coiled portion of the tape extends in converging relation to the axis of said drive means, and tape guide means mounted in said bin within the area substantially enclosed by said support means for controlling the path and the angle at which tape is withdrawn from the innermost wrap of the helically coiled portion of an endless tape supported on said support means, the surface of the tape guide means last contacted by the innermost wrap of the coiled portion of the tape as it is withdrawn from the bin extending approximately parallel to the axis of rotation of said drive means with the result that the tape is fed in an untwisted substantially straight line to the drive means.

2. The tape cartridge defined in claim 1 wherein said support means comprises a pair of diametrically oppositely positioned substantially semicircular, fixedly mounted spaced-apart wall members in the bin having their respective arcuate surfaces approximately centered on a common axis, and wherein said tape guide means comprises post means in the space between the semicircular wall members for guiding tape from the innermost wrap of said helically coiled portion of the tape through a U-shaped transport path in the area enclosed by said spaced-apart semicircular wall members.

3. The tape cartridge defined in claim 1 wherein said bin is generally cup-shaped and said tape support means therewithin comprises upstanding arcuate wall sections of similar radii of curvature centering on a common axis, and wherein said guide means comprises an upstanding generally elliptically shaped guide member in the area enclosed by said wall sections for guiding tape withdrawn from the innermost wrap of the helically coiled portion of the tape through a U-shaped turn within said area before being fed at said angle to said drive means.

4. The tape cartridge defined in claim 2 wherein said post means includes spaced-apart first and second fixedly mounted posts and additionally includes a planar guide member fixedly mounted intermediate said posts.

5. An endless loop tape cartridge comprising:

frame means defining a normally closed tape storage bin compartment and a normally closed elongated tape loop transport compartment opening at one end into the bin compartment, rotatably mounted drive means in the transport compartment for imparting movement to said endless loop of tape in the cartridge, segmental support means for supporting a portion of aid endless loop tape in helically coiled form in the bin compartment, the support means extending at an angle less than 90° to the axis of rotation of said drive means and disposing the plane of said coiled tape form at an inclination to said tape transport compartment, and tape guide means in the bin compartment mounted within the area enclosed by said segmental support means for guiding the direction and the angle at which tape is withdrawn from the innermost turn of said helically coiled form and is fed to said drive means, the surface of said guide means last contacted by the tape extending at an angle less than that of said support means to the axis of rotation of said drive means so that the tape is guided from the bin compartment to the drive means and return in untwisted substantially straight line condition.

6. The tape cartridge defined in claim 5 wherein the segmental support means includes a pair of oppositely positioned spaced-apart semicircular support members fixedly mounted within the bin and having their respective arcuate surfaces centered on a common axis, and wherein said guide means comprises an approximately elliptically shaped guide member fixedly mounted in the space between said support members, the opposite end surfaces of said elliptically shaped guide member extending substantially flush with the arcuate surfaces of said spaced-apart semicircular support members.

7. The tape cartridge defined in claim 5 wherein said segmental support means comprises a pair of substantially semicircular oppositely disposed support members, and wherein said tape guide means comprises a plurality of posts intermediate the pair of support members, the posts being positioned such that portions of the surfaces of said posts form a substantially continuous cylindrical tape support surface in conjunction with the tape support surfaces of said pair of semicircular members.

8. The endless loop tape cartridge defined in claim 5 wherein said drive means includes a shaft journaled for rotation in the tape transport compartment proximate the end thereof remote from the bin compartment, sprocket means fixed to said shaft for imparting rotational movement to a tape threaded therearound, and gear means fixed to said shaft exteriorly of the tape transport compartment for mechanically coupling rotational movement to the shaft.

9. The endless loop tape cartridge defined in claim 5 wherein said drive means includes a combined cylindrical drum and feed sprocket wheel about which a portion of the endless tape is trained for imparting rotational motion to the tape loop, the drum being recessed in its periphery for receiving sensing fingers from the associated tape reader during tape sensing operations.

10. The endless loop tape cartridge defined in claim 9 wherein said recessed periphery of the drum is constituted by a plurality of circumferentially extending, axially spaced-apart grooves, said grooves aligning with respective information positions of a multilevel code in said tape.

11. The endless loop tape cartridge defined in claim 9 wherein, the sprocket wheel is fixed to the midportion of a shaft journaled for rotation in the tape transport compartment proximate the end thereof remote from the bin compartment, and the drum is composed of a pair of stationary substantially cylindrical support members positioned about said shaft on opposite sides of said sprocket wheel and has its recessed periphery constituted by aligned slots in the support members extending across the path of travel of a tape transported by the sprocket wheel.

12. A tape cartridge insertable in and cooperable with a tape reader for guiding a length of tape past a sensing station of said tape reader, said cartridge comprising a housing defining an enclosed tape transport path for the tape, guide means supported within the housing for dividing the tape transport path into separate ingress and egress channels, a shaft journaled for rotation in said housing proximate one end of said path, sprocket means fixed to said shaft for imparting rotational movement to a tape threaded thereabout, gear means carried by said shaft exterior to said housing and cooperable with a tape reader for imparting rotational drive to said shaft in one direction, means in the housing for imposing a frictional drag on the shaft when rotated in said one direction, and means in the housing for preventing reverse rotation of the shaft, said last means including a pawl and ratchet assembly wherein the ratchet is fixed to said shaft and cooperates with said pawl for arresting rotational movement of said sprocket means in the reverse direction.

13. The tape cartridge defined in claim 12 additionally including resilient feed means depending into the ingress channel and in contact with said sprocket means for urging the free end of a tape inserted into said ingress channel into self-threading relationship with said sprocket means.

14. The tape cartridge defined in claim 12 additionally including, a closed tape storage bin in tape-feeding communication with the tape transport path of the housing, segmented support means fixedly mounted in said bin for supporting a helically coiled portion of the length of an endless tape loop within the bin and so that the plane of said helically coiled portion is angularly disposed relative to said tape transport path, and tape guide means fixedly mounted in the area intermediate said segmented support means for controlling the angle and path at which tape is withdrawn from the innermost wrap of said helically coiled portion and for guiding the tape portion withdrawn from the innermost wrap in a straight line onto said sprocket past the helical wrap.

15. The tape cartridge defined in claim 2 wherein said post means includes a plurality of spaced-apart posts and wherein the post farthest from said drive means is positioned substantially parallel with the axis of rotation of said drive means whereby tape withdrawn from the innermost wrap of the coiled portion of the tape is guided around said parallelly disposed post and so that it is projected in a straight line onto said drive means past the coiled portion of the tape on said support means.

16. The tape cartridge defined in claim 3 wherein the upstanding end of the elliptical guide member farthest from said drive means serves as the last surface of the guide member contacted by the tape before leaving the bin, said upstanding end extending at an angle approximately parallel to the axis of rotation of the drive means whereby tape withdrawn from the innermost turn of the tape stored on the support means in helical wrap form is guided around said end of the guide member so that it is projected in an untwisted substantially straight line path onto said drive means past the helical turns of tape wrapped on said support means.

17. Data input apparatus comprising:

frame means defining a tape storage compartment and an elongated tape loop transport compartment forming an extension to the storage compartment and opening into communication therewith, a selectively mutilated perforated tape arranged in an endless loop configuration and comprising a length of weblike material including an information section for the greater part of its length and a shorter position indicating section, and further having a portion thereof helically coiled and seated in the storage compartment and another portion thereof forming a loop extending from the coiled portion and lying within the tape transport compartment, means within said storage compartment for supporting the coiled portion of the tape at an inclination relative to the path of the tape loop in the transport compartment and such that the tape loop for the transport compartment extends in untwisted condition clear of the tape coiled portion seated in the storage compartment, said endless tape having a plurality of groups of information apertures spaced apart in the information zone of said weblike material, the information apertures being arranged in accordance with a predetermined binary code, and further having a row of tape feed apertures regularly spaced apart throughout at least the information zone of said weblike material.

a rotatable sprocket wheel in the transport compartment for engaging the tape feed apertures of the tape and for moving the portion of the tape in the transport compartment and the turns of the tape in the coiled portion thereof, and an elongated opening located in the position-indicating zone in the area corresponding to and in alignment with the row of the tape feed apertures such that when the opening in the tape reaches the sprocket wheel the latter is prevented from imparting movement to the endless loop tape thus stopping further advancement of the tape even though the sprocket wheel continues to rotate.

18. An endless loop of information-bearing tape, said tape being cooperable with drive apparatus of a tape reading apparatus for insuring a single pass of information recorded on the tape past the reading station of said tape reading apparatus, said tape comprising a weblike member having its respective ends spliced to form an endless loop, said member including an information zone and a position indicating zone, a plurality of information areas regularly spaced apart throughout the extent of said information zone of said member for accommodating information to be recorded, said information being encoded in accordance with a predetermined code, a row of regularly spaced-apart sprocket holes formed in said weblike member and extending longitudinally thereof for at least the extent of said information zone and being engageable by the teeth of a rotatable sprocket wheel for moving the member, and an elongated opening in said row of sprocket holes formed in at least a portion of said position-indicating zone of said member for preventing the feeding of the member past said reading station when the elongated opening is cooperably juxtapositioned with respect to the sprocket wheel even though the latter continues to rotate.

19. The tape cartridge defined in claim 12 additionally including tape guide means carried by said pawl for stripping tape fed by said sprocket means from the teeth thereof.

20. The tape cartridge defined in claim 12 wherein said drag-imposing means forms a part of the pawl which is cooperable with at least a portion of the surface of said sprocket means for developing a retarding frictional drag on said sprocket means during rotation thereof in said one direction.

21. The tape cartridge defined in claim 12 wherein a cylindrical drum is fixed to the shaft adjacent to the sprocket means and about which a portion of the tape threaded on the sprocket means is trained, the drum being recessed in its periphery for receiving sensing fingers from an associated tape reader during tape-sensing operations.

22. The tape cartridge defined in claim 21 wherein said recessed periphery of the drum is constituted by a plurality of circumferentially extending, axially spaced-apart grooves, said grooves aligning with respective information positions of a multilevel code in the tape which is trained about the drum.

23. The tape cartridge defined in claim 21 wherein the sprocket means is fixed to the midportion of the shaft and wherein the drum is composed of a pair of substantially cylindrical support members coaxially fixed to the shaft on opposite sides of said sprocket means, the recessed periphery of the drum being constituted by aligned slots in the support members which extend across the path of travel of a tape threaded about the sprocket means and transported thereby.